(12) United States Patent
Yageta et al.

(10) Patent No.: US 7,736,801 B2
(45) Date of Patent: Jun. 15, 2010

(54) FILM COVERED ELECTRIC DEVICE AND METHOD OF MANUFACTURING THE SAME

(75) Inventors: Hiroshi Yageta, Sagamihara (JP); Makihiro Otohata, Sagamihara (JP)

(73) Assignee: NEC Corporation, Tokyo (JP)

( * ) Notice: Subject to any disclaimer, the term of this patent is extended or adjusted under 35 U.S.C. 154(b) by 771 days.

(21) Appl. No.: 10/554,064

(22) PCT Filed: Mar. 10, 2005

(86) PCT No.: PCT/JP2005/004191
§ 371 (c)(1),
(2), (4) Date: Oct. 24, 2005

(87) PCT Pub. No.: WO2005/091398
PCT Pub. Date: Sep. 29, 2005

(65) Prior Publication Data
US 2006/0210872 A1  Sep. 21, 2006

(30) Foreign Application Priority Data
Mar. 23, 2004  (JP) ............... 2004-085249

(51) Int. Cl.
*H01M 2/08*  (2006.01)
*H01M 2/02*  (2006.01)
*H01G 2/10*  (2006.01)

(52) U.S. Cl. .................. 429/185; 429/163; 429/179; 29/623.2; 361/517; 361/535

(58) Field of Classification Search .............. None
See application file for complete search history.

(56) References Cited

U.S. PATENT DOCUMENTS

| 6,877,216 B2* | 4/2005 | Fukuda et al. ............ 429/171 |
| 7,261,971 B2* | 8/2007 | Higuchi et al. ............ 429/94 |
| 2003/0049527 A1* | 3/2003 | Yageta et al. ............ 429/179 |
| 2004/0048152 A1* | 3/2004 | Yata et al. ............ 429/162 |

FOREIGN PATENT DOCUMENTS

JP       2000-133216 A      5/2000

(Continued)

*Primary Examiner*—Dah-Wei D Yuan
*Assistant Examiner*—Edu E Erin-Okut
(74) *Attorney, Agent, or Firm*—Sughrue Mion, PLLC (57) ABSTRACT

The occurrence of micro-crack is prevented at the root of a thermally sealed area of casing materials even if a thick electric device element is sealed. Film covered battery 10 has cell element 13 to which leads 12a, 12b are connected, and casing films 11 for sealing cell element 13 with leads 12a, 12b extended therefrom. Casing films 11 are thermally sealed along the periphery to seal cell element 13. Thermally sealed area 13 of casing films 11 is positioned between both surfaces of cell element 13 in the thickness direction of cell element 13. On a side of casing films 11 from which leads 12a, 12b are not extended, close contact zone 15, in which casing films 11 are not thermally sealed to each other but are in close contact with each other, is formed continuously to a space which receives cell element 13. Close contact zone 15 has a length of one-half or more of the distance from one end to the other end of an inner edge of thermally sealed area 14.

14 Claims, 6 Drawing Sheets

FOREIGN PATENT DOCUMENTS

| | | |
|---|---|---|
| JP | 2001-052748 A | 2/2001 |
| JP | 2001-068073 A | 3/2001 |
| JP | 2001-126678 A | 5/2001 |
| JP | 2002-015713 A | 1/2002 |
| JP | 2004-342449 A | 12/2004 |

* cited by examiner

RELATED ART

FIG. 10

RELATED ART

FILM COVERED ELECTRIC DEVICE AND METHOD OF MANUFACTURING THE SAME

TECHNICAL FIELD

The present invention relates to a film covered electric device which has an electric device element such as a chemical cell element or a capacitor element contained in a casing material made of a film.

BACKGROUND ART

Conventionally, as a film covered battery which uses a thermally sealable film as a casing material, there is known one which has a structure in which a cell element is covered with a laminate film, and open edges of the laminate film are thermally sealed, with lead ends of a positive pole and a negative pole connected to the cell element protruded from the laminate film, thereby hermetically sealing (hereinafter simply called "seal" in some cases) the cell element. The laminate film used herein is made up of a metal layer and a thermally sealable resin layer laminated to each other. This type of film covered battery has the advantage of being readily reduced in thickness, and most of conventional film covered batteries have flat shapes.

Like those using other casing materials, a battery which uses a film for a casing material is also required to ensure the sealing reliability in a sealed portion so as to prevent introduction of external air into the battery and leakage of an electrolytic solution in the battery. Particularly, for a battery which includes a nonaqueous electrolytic solution (hereinafter sometimes called the "nonaqueous electrolytic battery"), the sealing reliability is critical. Defective sealing, if any, would cause the electrolytic solution to deteriorate due to components of external air, so that the battery performance significantly deteriorates.

Also, in a battery which uses a film for a casing material, particularly when a cell element has a certain degree of thickness, the film is generally deep-draw molded in the shape of a cup in conformity to the outside shape of the cell. This is intended to improve a cell element containment efficiency and to improve the outer appearance of the battery.

As such a conventional film covered battery, JP-A-2000-133216 discloses a battery in which a casing material made of an aluminum laminate film is formed with a cup area conformal to the outside shape of a cell element through deep-draw molding, and the casing materials are thermally sealed near the cell element. According to this document, by forming the casing material with the cup area conformal to the outside shape of the cell element, the occurrence of wrinkles is prevented even if the casing materials are thermally sealed to each other quite near the cell element for sealing, thus providing a volumetrically efficient battery.

DISCLOSURE OF THE INVENTION

As described above, it is effective, in view of improvements in volumetric efficiency, to form the casing material with the cup area, and thermally seal the casing materials near the cell element. However, as the cell element has a larger thickness, other problems, which have not been conventionally known, will occur. The aforementioned document merely considers a cell element, the thickness of which is approximately 6 mm.

Large capacity batteries can use cell elements, the thickness of which ranges from 6 to 14 mm. However, since there are limitations to the depth of drawing when a casing material made of a film is formed with a cup area, it is often necessary to form not only a casing material on one side but casing materials on both sides with cup areas, and place the cup areas opposite to each other to place therein a cell element, the thickness of which is twice the depth of drawing.

The present inventors encountered the following problem when they advanced investigations on how to accommodate a cell element of 6-14 mm thick in a casing material formed with a cup area, with the intention of bringing large-capacity film covered batteries into practical use. The problem is that if a thermally sealed area of the casing materials is too close to the cell element, the root of the thermally sealed area is pressed against the cell element by the action of the atmospheric pressure on the casing materials when the film covered battery is sealed in a reduced pressure atmosphere and returned back into the atmospheric pressure. When the root of the thermally sealed area is pressed against the cell element, an unwanted stress is immanent at the root of the thermally sealed area. This stress causes the occurrence of a micro-crack into the casing materials. Also, this problem is prominent when the cup areas are formed in the casing materials on both sides of the cell element, and the cup areas are placed opposite to each other for sealing the cell element therein. This is because the thermally sealed area is positioned between both surfaces of the cell element.

In the following, this problem will be described with reference to FIGS. 9 and 10.

In film covered batteries, the cell element is often sealed in a reduced pressure atmosphere, as mentioned above. When the cell element is sealed in a reduced pressure atmosphere, the casing materials are pressed against the cell element by the atmospheric pressure when the sealed film covered battery is returned into the atmospheric pressure. As a result, as illustrated in FIG. 9, a phenomenon occurs that thermally sealed area 124 is curved inwardly on those sides of film covered battery 120, from which leads 122 are not drawn out. This is a phenomenon which is caused by the resulting structure in which casing materials 121 are thermally sealed to leads 122 on the sides from which leads 122 are drawn out, thereby restricting displacements of casing materials 121, whereas casing materials 121 are not particularly secured to another member on the sides from which leads 122 are not drawn out and are freely displaceable in a range until they substantially come into close contact with cell element 123 contained therein.

As the sealed sides of casing materials 121 are curved, the thermally sealed area displaces in a direction closer to the cell element, and the root of the thermally sealed area is pressed against the cell element. As a result, as illustrated in FIG. 10, force F2 acts in a direction in which thermally sealed area 124 is peeled off at the root of thermally sealed area 124. When the film covered battery is left for a long time or undergoes a thermal shock test with force F2 applied to casing materials 121, a micro-crack can occur in a thermally sealable resin layer, which is the innermost layer of casing material 121, on the root of thermally sealed area 124. Though depending on the size, if a micro-crack occurs in casing material 121, a large one will affect the performance of sealing the cell element.

When a battery is applied with a voltage out of a rated range while the battery is in use, a gas species can be produced by electric decomposition of an electrolytic solution to increase the internal pressure of the battery. Further, when the battery is used at high temperatures out of a rated range, materials, which can seed the gas species, can be produced due to decomposition of electrolytic salt or the like. When a micro-crack occurs in the casing material, an increase in the internal pressure causes the micro-crack to be conducive to a large break into the casing material, and to the formation of a leak path with external air in the worst case.

As described above, the occurrence of micro-crack is a factor of degrading the sealing reliability of the cell element. Also, not limited to the film covered battery, this problem can generally arise in a film covered electric device that has an electric device, sealed by a casing material made of a film, which has a structure in which a positive pole and a negative pole are placed opposite to each other.

It is therefore an object of the present invention to provide a film covered electric device and a method of manufacturing the same, which prevent the occurrence of micro-crack at the root of a thermally sealed area of casing materials even if a thick electric device element is sealed by the casing materials.

To achieve the above object, a film covered electric device of the present invention has an electric device element to which a positive and a negative pole lead are connected, and casing films each having a structure in which at least a metal layer and a thermally sealable resin layer laminated to each other, wherein the casing films sandwich the electric device element from both sides in its thickness direction with the thermally sealable resin layer being placed inside, wrap the electric device element, and is thermally sealed around the electric device element to seal the electric device element with the leads extended therefrom. Further, in the film covered electric device of the present invention, the casing film is formed with a cup area for receiving the electric device element therein, whereby a thermally sealed area formed by thermally sealing the casing film is positioned between both surfaces of the electric device element in the thickness direction in regard to the thickness direction of the electric device element, at least one of sides of the sides of the casing film, from which the leads are not extended, is formed with a close contact zone in which the casing films directly opposing without intervention of the electric device element are in close contact with each other without being thermally sealed, between the thermally sealed area and the electric device element, and $L2 \geq (1/2)L1$ is satisfied, where $L1$ is the distance from one end to the other end of an inner edge of the thermally sealed area in a direction along the side formed with the close contact zone, and $L2$ is the length of the close contact zone.

In this way, by setting length $L2$ of the close contact zone to one-half or more of distance $L1$ from one end to the other end of the inner edge of the thermally sealed area, a relaxed pealing force of the casing films acts on the root of the thermally sealed area. The close contact zone is preferably formed over the entire range from one end to the other end of the inner edge of the thermally sealed area. Also, the effect of the thermally sealed area is particularly effective when the casing film is formed with the cup area for receiving the electric device element therein.

A method of manufacturing a film covered electric device of the present invention has the steps of sandwiching an electric device element to which a positive pole lead and a negative pole lead are connected by a casing films having at least a metal layer and thermally sealable resin layer laminated to each other from both sides in a thickness direction of the electric device element, thermally sealing peripheral sides of the casing film which sandwiches the electric device element with the leads being extended from the casing films to seal the electric device element within the casing film, wherein at least the last one side of the peripheral sides is thermally sealed in a reduced pressure atmosphere, and returning surroundings of the casing film which seals the electric device element into an atmospheric pressure, wherein the step of thermally sealing the casing film thermally seals at least one of the sides from which the leads are not extended by applying pressure to the casing film with a thermal sealing head for heating and pressurizing the casing films being placed at a position spaced apart by 2 mm or more from the electric device element.

According to the method of manufacturing a film covered electric device of the present invention, when surroundings of the casing films which seal the electric device element are returned to the atmospheric pressure atmosphere, the casing films are pressed against each other by the atmospheric pressure. When the casing films are thermally sealed, at least one of sides from which the leads do not extend is thermally sealed by applying pressure to the casing films with the thermal sealing head placed at a position spaced apart by 2 mm or more from the electric device element, so that the casing films are thereabout pressed against each other by the atmospheric pressure, thereby forming a close contact zone between the cell element and the thermally sealed area. In other words, a thermal sealing head in a special shape is not needed for forming the close contact zone.

As described above, according to the present invention, the close contact zone, which is a region in which the directly opposing casing films are not thermally sealed to each other but are in close contact with each other, is formed at a predetermined position and range of the casing films. From this fact, it is possible to relax a peeling force of the casing films acting on the root of the thermally sealed area, which tends to occur particularly when the electric device element is thick. As a result, a micro-crack can be prevented from occurring at the root of the thermally sealed area. Also, according to the method of manufacturing a film covered electric device of the present invention, the close contact zone can be extremely simply formed only by defining the distance between the thermal sealing head used to thermally seal the casing films and the electric device element, using a thermal sealing head generally used to thermally seal casing films.

BRIEF DESCRIPTION OF THE DRAWINGS

[FIG. 8]

A plan view of the film covered battery, illustrating a further example of the close contact zone formed in the casing films.

[FIG. 9]

A plan view for describing a trouble which occurs in the thermally sealed area, when the cell element is sealed, in a general film covered battery.

[FIG. 10]

A cross-sectional view through a side of the film covered battery illustrated in FIG. 9, from which no lead terminal is drawn out.

BEST MODE FOR CARRYING OUT THE INVENTION

Figure 1:
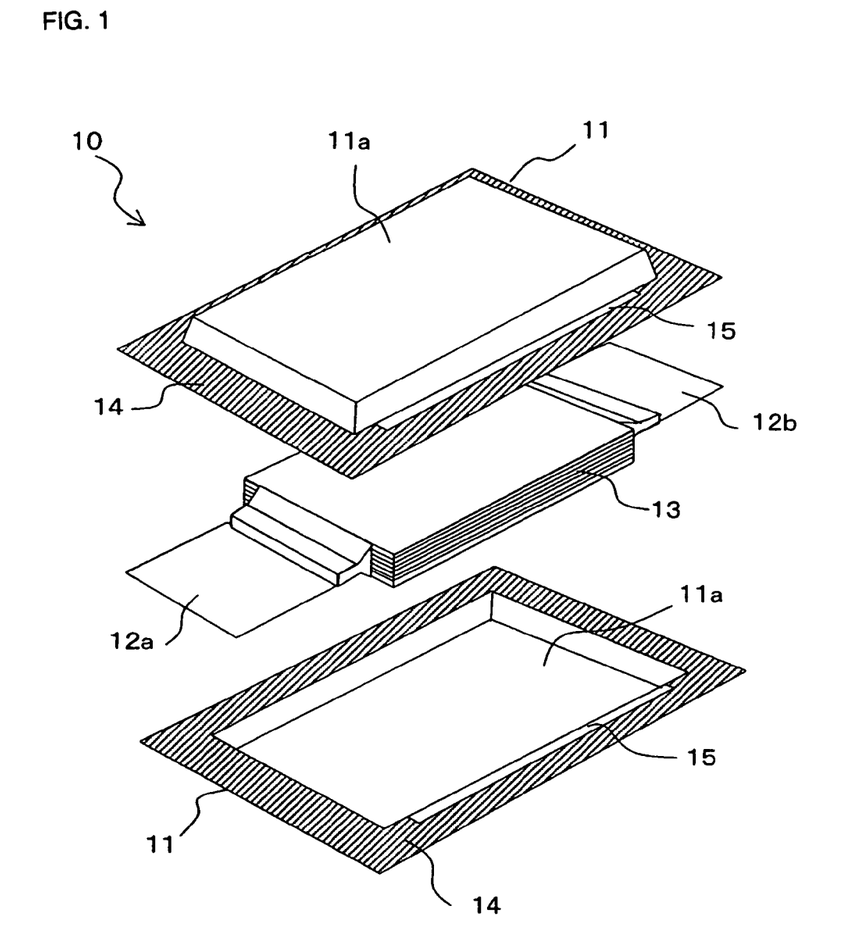
[FIG. 1]
An exploded perspective view of a film covered battery according to one embodiment of the present invention.

Referring to FIG. 1, there is illustrated film covered battery 10 according to one embodiment of the present invention which has cell element 13 substantially in the shape of rectangular solid, having a structure of a plurality of laminated positive poles and negative poles; positive pole lead 12a and negative pole lead 12b connected to the positive poles and negative poles, respectively, of cell element 13 (hereinafter positive pole lead 12 and negative pole lead 12b are collectively called simply the "leads" in some cases); and casing films 11 for sealing cell element 13 with parts of positive pole lead 12a and negative pole lead 12b being extended therefrom.

Cell element 13 comprises a plurality of positive poles and negative poles, each of which is made of a metal foil coated with an electrode material on both surfaces, alternately laminated through separators. An uncoated portion, which is not coated with the electrode material, protrudes from one side of each positive pole and each negative pole. The uncoated portions of the positive poles, and the uncoated portions of the negative poles are ultrasonic welded to each other in the gross, and are connected to positive pole lead 12a and negative pole lead 12b, respectively. The positive poles and negative poles are stacked with the portions not coated with the electrode material being protruded in opposite directions. Therefore, positive pole lead 12a and negative pole lead 12b are drawn out from sides opposite to each other of film covered battery 10. Though cell element 13 is not particularly limited in thickness, the present invention is particularly effective when cell element 13 has a thickness of 6 mm or more.

In nonaqueous electrolytic batteries such as a lithium ion battery, generally, an aluminum foil is used for the metal foil which forms part of the positive pole, while a copper foil is used for the metal foil which forms part of the negative pole. Then, an aluminum plate is used for positive pole lead 12a, while a nickel plate or a copper plate is used for negative pole lead 12b. When negative pole lead 12b is made of a copper plate, nickel may be plated on its surfaces.

Used for the separator can be a sheet-shaped member which can be impregnated with an electrolytic solution, such as a micro-porous film (micro-porous film), an unwoven fabric, or a woven fabric made of a thermally plastic resin such as polyolefin.

Casing film 11 is made up of two laminate films which sandwich and surround cell element 13 on both sides in the thickness direction, and their opposing surfaces, which match around cell element 13, are thermally sealed to each other to seal cell element 13 therein. In FIG. 1, a thermally sealed region of casing film 11 is indicated by hatchings as thermally sealed area 14 (in subsequent figures, the thermally sealed area is indicated by hatchings in a similar manner). Each casing film 11 is formed with cup area 11a in a central region, respectively, for forming a cell element receiving volume which is a space surrounding cell element 13. Cup area 11a can be formed through deep-draw molding.

As the laminate films which constitute casing film 11, a film generally used for this type of film covered batteries can be used as long as it is flexible and can seal cell element 13 so as to prevent the electrolytic solution from leaking. A representative laminate structure of the laminate films used for casing film 11 may be a structure of a metal thin-film layer and a thermally sealable resin layer laminated to each other, or a structure including a protection layer, made of a film of polyester such as polyethylene terephthalate, nylon, or the like, laminated further on the opposite side of a metal thin-film layer to a thermally sealable resin layer. For sealing cell element 13, the thermally sealable resin layers are placed opposite to each other to surround cell element 13.

Used as the metal thin-film layer can be, for example, a foil of Al, Ti, Ti alloy, Fe, stainless steel, Mg alloy, or the like, which has the thickness of 10 μm to 100 μm. Resins used for the thermally sealable resin layer are not particularly limited as long as they are resins which can be thermally sealed, for example, polypropylene, polyethylene, metamorphic acid thereof, polyester such as polyethylene sulfide, polyethylene terephthalate and the like, polyamide, ethylene-vinyl acetate copolymer, and the like can be used. The thickness of the thermally sealable resin layer is preferably from 10 to 200 μm, and more preferably from 30 μm to 100 μm.

Cell element 13 may be sealed by casing films 11 by sandwiching cell element 13 with two casing films 11, and thermally sealing the four sides along the periphery of casing films 11 around cell element 13 with positive pole lead 12a and negative pole lead 11b protruded from casing films 11, as in this embodiment. Alternatively, a single casing film, which has a size approximately twice this casing film 11, may folded in two to sandwich cell element 13, and the three open sides may be thermally sealed.

In thermally sealing casing films 11, casing films 11 are thermally sealed except for one side to make the shape of a bag which has an internal space for receiving cell element 13, and an electrolytic solution is poured into the bag. Subsequently, the remaining one side is thermally sealed in a reduced pressure atmosphere to seal cell element 13. For sealing cell element 13 in the reduced pressure atmosphere, a vacuum sealing machine can be used, which has a vacuum chamber that is provided therein with a thermal sealing device. After sealing cell element 13, casing films 11, in which cell element 13 has been sealed, is returned to the atmosphere, causing casing films 11 to deform to come into close contact with the surface of cell element 13. If the electrolytic solution can also be poured in the reduced pressure atmosphere, the thermal sealing except for the last one side may be performed in the reduced pressure atmosphere.

As illustrated in FIG. 1, casing film 11 is formed with thermally sealed area 14 around cup area 11a. Among the respective sides the periphery of casing films 11, thermally sealed area 14 is formed at a location spaced apart from cup area 11a in part of the sides from which positive pole lead 12a or negative pole lead 12b is not drawn out. In this way, casing films 11 are formed with close contact zone 15 in which opposing casing films 11 are simply in close contact with each other without cup area 11a formed therein or being thermally sealed, continuously to cup areas 11a, i.e., the space which contains cell element 13.

As described above, when cell element 13 is sealed in a reduced pressure atmosphere, film covered battery 10 after the sealing has the inwardly curved sides, from which the leads are not drawn out. Then, it is though that a micro-crack occurs in the thermally sealable resin layer of casing films 11 by a force applied to thermally sealed area 14 at that time. Therefore, it is thought that if the force applied to thermally sealed area 14 is relaxed on the sides from which no leads are drawn out, it is possible to prevent the micro-crack from occurring and consequently prevent a degradation in the reliability of sealing cell element 13. Close contact zone 15 formed in casing films 11 serves to relax the force applied to thermally sealed area 14.

Figure 2:
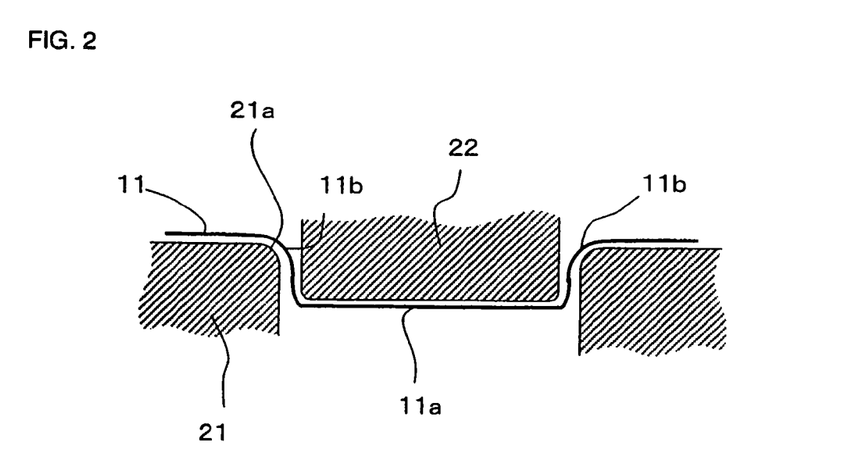
[FIG. 2]
A diagram for describing deep-draw molding for forming a cup area in a casing film.

As illustrated in FIG. 2, casing film 11 is formed with cup area 11a through deep-draw molding by using a dice 21 which has an opening conformal to the shape of cup area 11a and punch 22 which fits in the opening of dice 21 through a predetermined clearance, and drawing casing film 11, held on dice 21 by a blank holding pad (not shown), by dice 21. Shoulder 21a of dice 21 is processed to be curved in order to smoothly draw casing film 11 into the opening. Therefore, casing film 11 after molding is formed with R-portion section responding to shoulder 21a of dice 21 at the root of cup area 11a.

Figure 3:
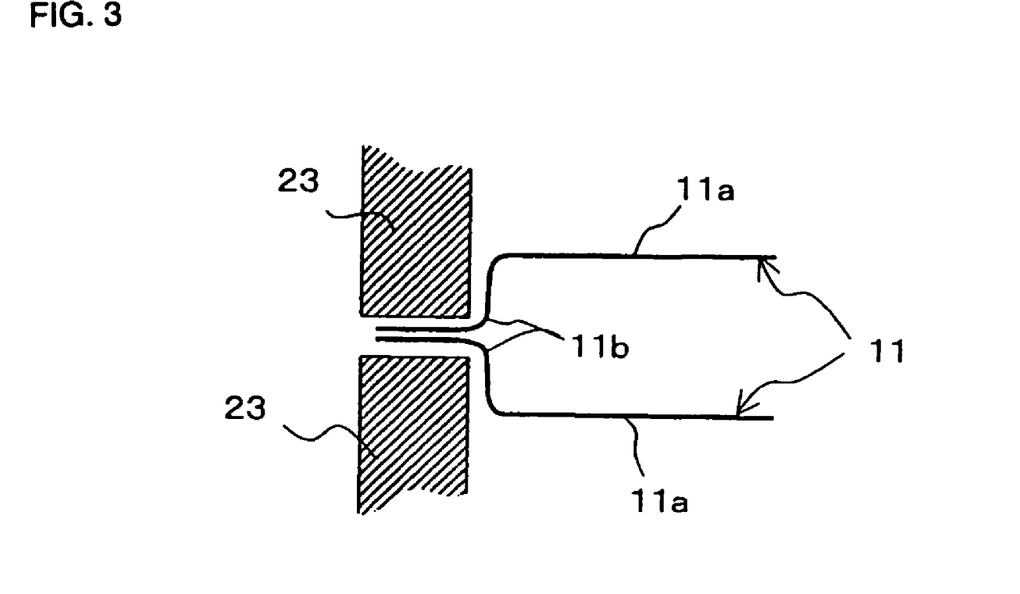
[FIG. 3]
A diagram for describing a method of thermally sealing casing films.
Figure 4:
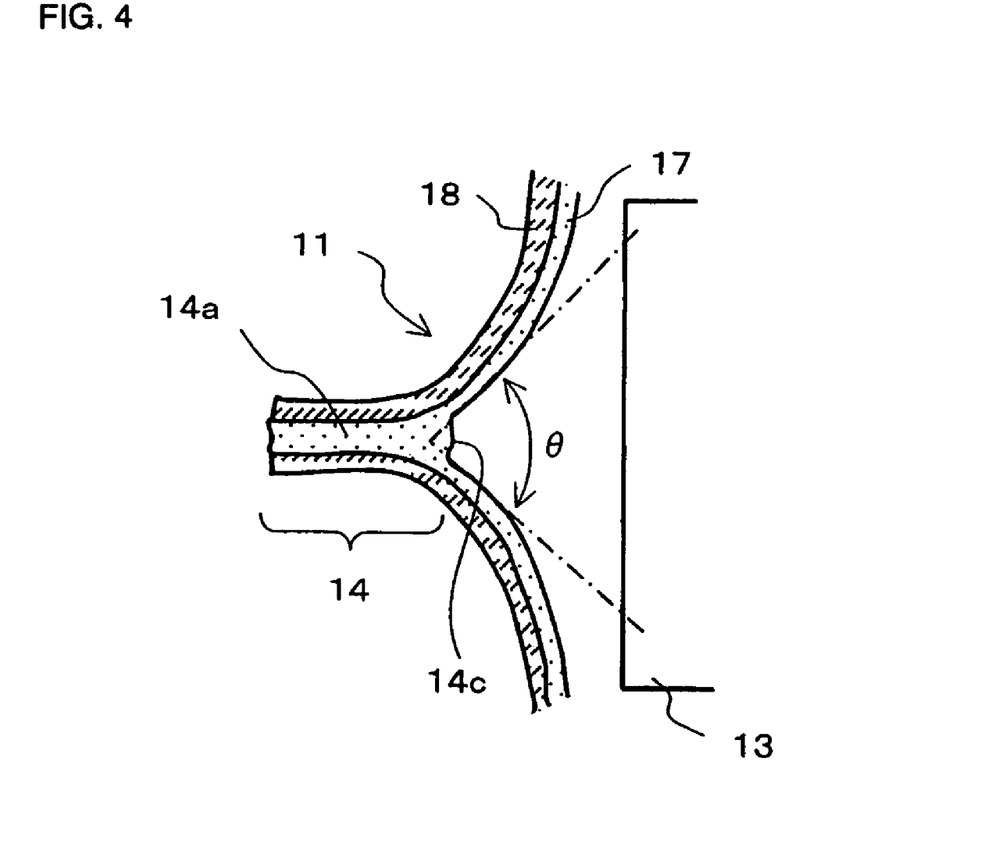
[FIG. 4]
A cross-sectional view illustrating the state of the casing film after normal thermal sealing.

Then, for thermally sealing casing films 11 formed with cup area 11a through the deep-draw molding, flange portions of casing films 11 are heated and pressurized by a pair of thermal sealing heads 23. In this event, thermal sealing heads 23 are applied to casing films 11 at positions spaced away from side surfaces of cup area 11a so as not to collapse R-section 11b in order to prevent damages to casing film 11. Therefore, as the state of casing film 11 after the thermal sealing, angle θ formed by both casing films 11 at the root of thermally sealed area 14 cannot be 180° or more, and is normally 90° or less, as illustrated in a cross-sectional view of FIG. 4. In FIG. 4, sealed layer 14a, which is integrated in each thermally sealed area 14, comprises thermally sealable resin layers 17 sealed to each other. Root 14c of the thermally sealed area is the end of sealed layer 14a, and angle θ is the angle formed by thermally sealable resin layers 17 at this position. Also, a layer outside thermally sealable resin layer 17 is metal thin-film layer 18.

After the thermal sealing has been performed, the last one side of casing film 11 is thermally sealed in a reduced pressure atmosphere (the aforementioned thermal sealing can be performed on the last one side) to seal cell element 13. Thereafter, as surroundings of casing film 11 are returned to the atmosphere, casing films 11 are pressed against the side surfaces of cell element 13 by the atmospheric pressure. Here, in the conventional idea, from a viewpoint of space efficiency, the thermal sealing is performed at a position closest possible to cell element 13. For this reason, the root of thermally sealed area 14 is also pressed directly against cell element 13 by the atmosphere. In this way, there acts a force which extends the angle θ formed by casing films 11 at the root of thermally sealed area 14, i.e., a force which peels off casing films 11 in thermally sealed area 14 (force F2 shown in FIG. 10).

Thus, by applying thermal sealing head 23 to casing films 11 at a position spaced apart from cell element 13 by an appropriate distance during the thermal sealing of casing films 11, the aforementioned close-contact portion 15 can be formed in film casing materials 11. By providing this close-contact portion 15 at a specific position and range, it is possible to effectively relax the force applied to thermally sealed area 14.

In the following, a description will be given of the behavior of casing films 11 on the side on which close contact zone 15 is formed, when cell element 13 is sealed in the reduced pressure atmosphere with reference to FIGS. 5A and 5B which are cross-sectional views in a region in which close-contact portion 15 is formed.

Figure 5A:
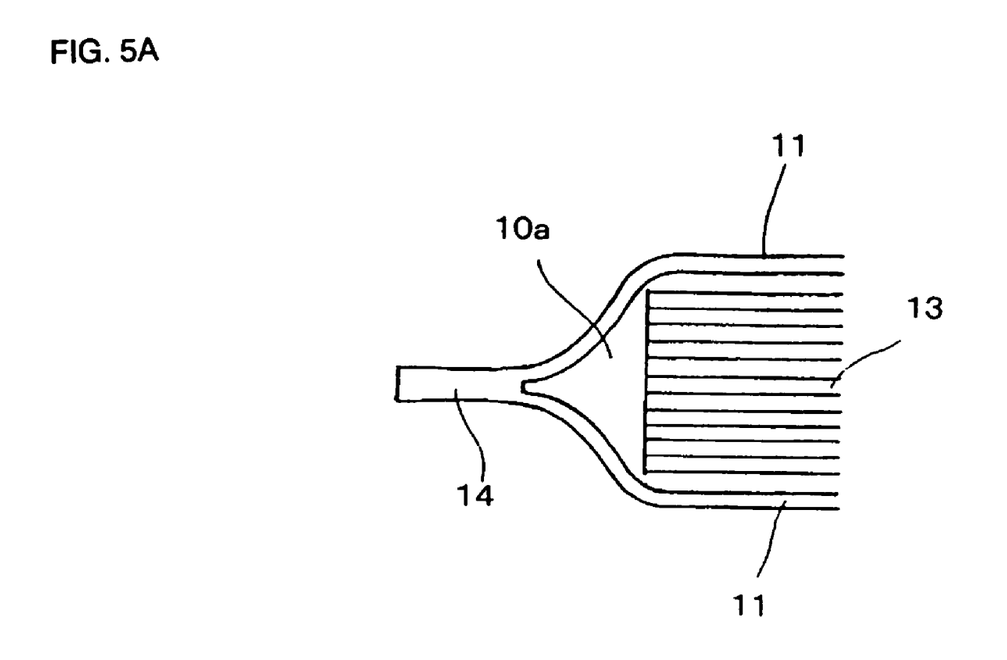
[FIG. 5A]
A cross-sectional view of casing films in a portion in which a close contact zone is formed in a reduced pressure atmosphere when a cell element is sealed at a reduced pressure, in the film covered battery illustrated in FIG. 1.

First, as illustrated in FIG. 5A, when cell element 13 is sealed in a reduced pressure atmosphere using a vacuum sealing machine, the pressure within space 10a (within cup areas 11a) which receives cell element 13, surrounded by casing films 11, is the same as the pressure outside the film covered battery in the reduced pressure atmosphere which is the state before the chamber of the vacuum sealing machine is opened to the atmosphere. Therefore, no force acts on thermally sealed area 14 of casing films 11.

Figure 5B:
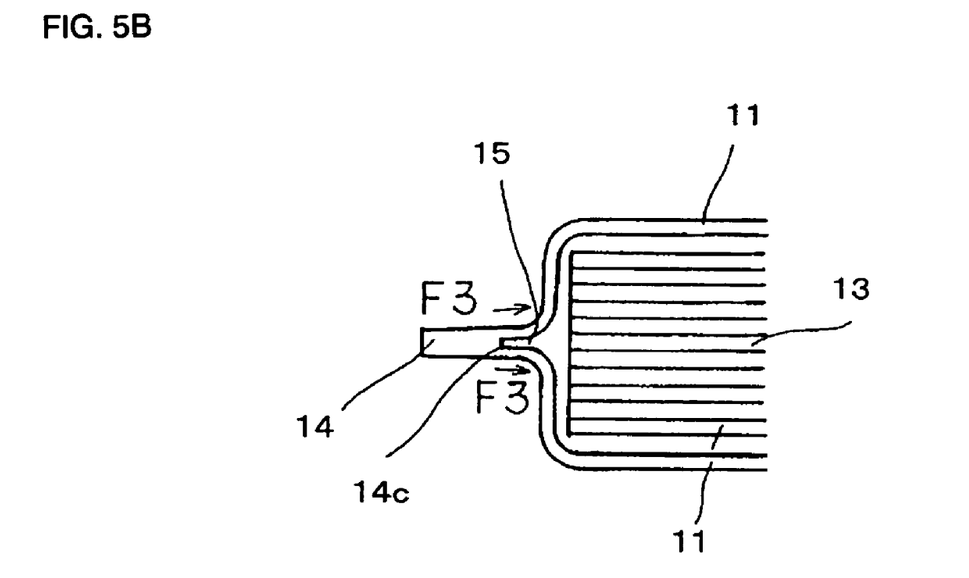
[FIG. 5B]
A cross-sectional view of casing films in a portion in which a close contact zone is formed in the atmospheric pressure when a cell element is sealed at a reduced pressure, in the film covered battery illustrated in FIG. 1.

Subsequently, as the chamber of the vacuum sealing machine is opened to the atmosphere to return the surroundings of the film covered battery to the atmospheric pressure, force F3 acts on press casing films 11 inward by the atmosphere, as illustrated in FIG. 5B. Since thermally sealed area 14 is formed at a position spaced apart from cell element 13, regions of casing films 11, which have not been thermally sealed to each other, come into close contact with each other between cell element 13 and thermally sealed area 14 by force F3 to form close-contact portion 15. With the existence of close-contact portion 15, in which casing films 11 are not thermally sealed to each other, between cell element 13 and thermally sealed area 14, root 14c of thermally sealed area 14 is not directly pressed against cell element 13, and the angle formed by casing films 11 to each other is substantially held at 0° at root 14c. As a result, even if cell element 13 is thick, for example, having a thickness of 6 mm or more, a force which acts to peel off thermally sealed area 14 is reduced in a portion in which close contact zone 15 is formed.

Figure 9:
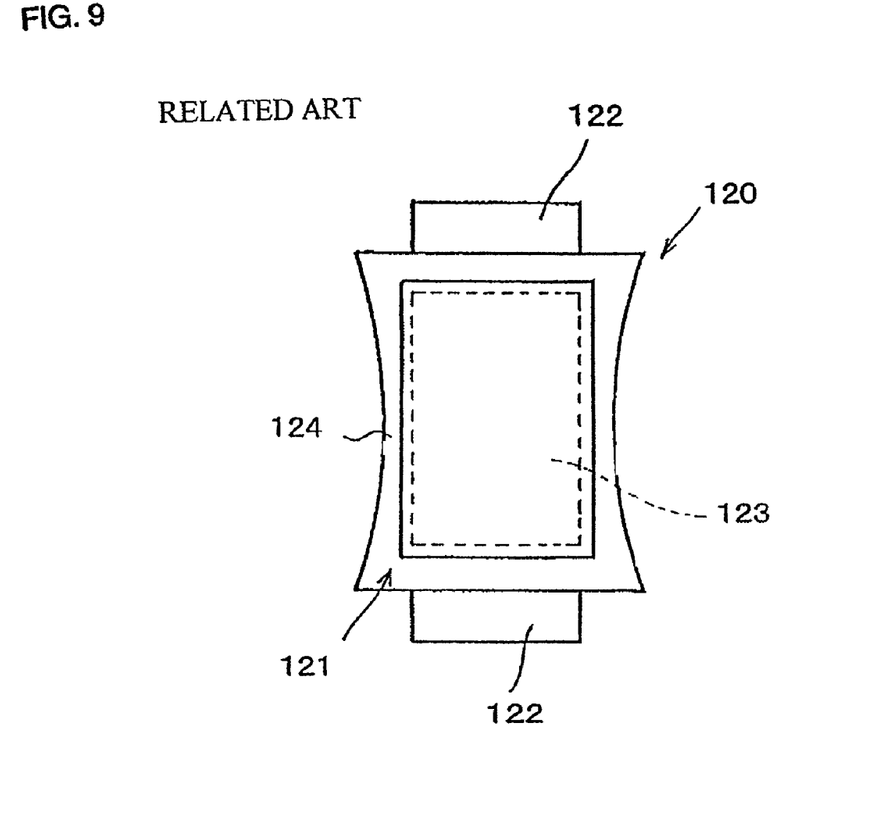
Figure 10:
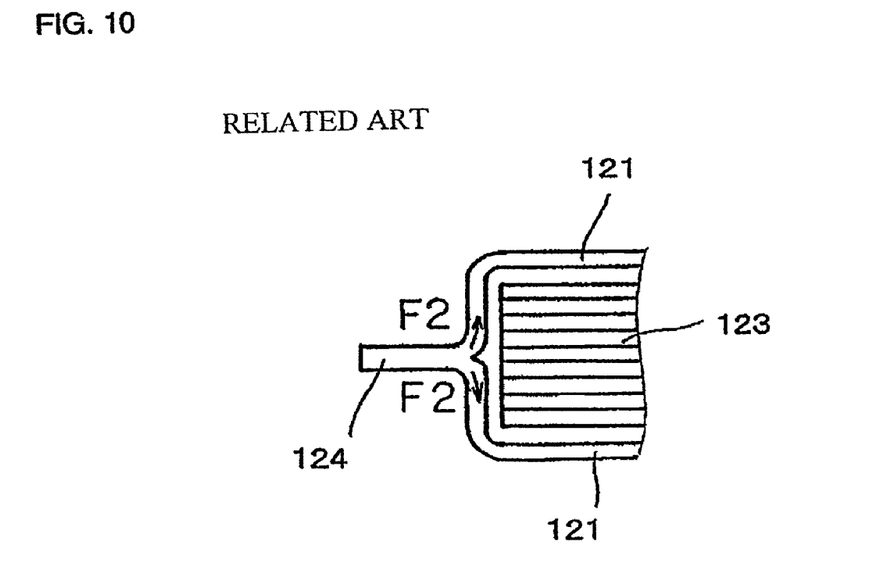

The amount of deformation of casing films 11 by the atmospheric pressure is the largest at the center on the side, from which the lead is not drawn out, in its lengthwise direction, as illustrated in FIG. 9. A peeling force acting on root 14c of thermally sealed area 14 is larger as the amount of deformation of casing films 11 is larger. In other words, on the side from which the lead is not drawn out, it is the center of the side in the lengthwise direction that a micro-crack occurs in casing film 11 with the highest possibility. Taking this into consideration, close contact zone 15 is preferably disposed in a region which includes the center of the side, from which the lead is not drawn out, in the lengthwise direction. However, a range in which casing film 11 is curved by the atmospheric pressure has a certain degree of extent in the lengthwise direction of the side, centered at the center of the side. Therefore, a portion in which root 14c of thermally sealed area 14 is pressed against cell element 13 also has a certain degree of extent in the lengthwise direction of the side, so that even if close contact zone 15 is disposed in a range which is small with respect to the length of the side, close contact zone 15 cannot sufficiently relax a force applied to thermally sealed area 14.

Figure 6:
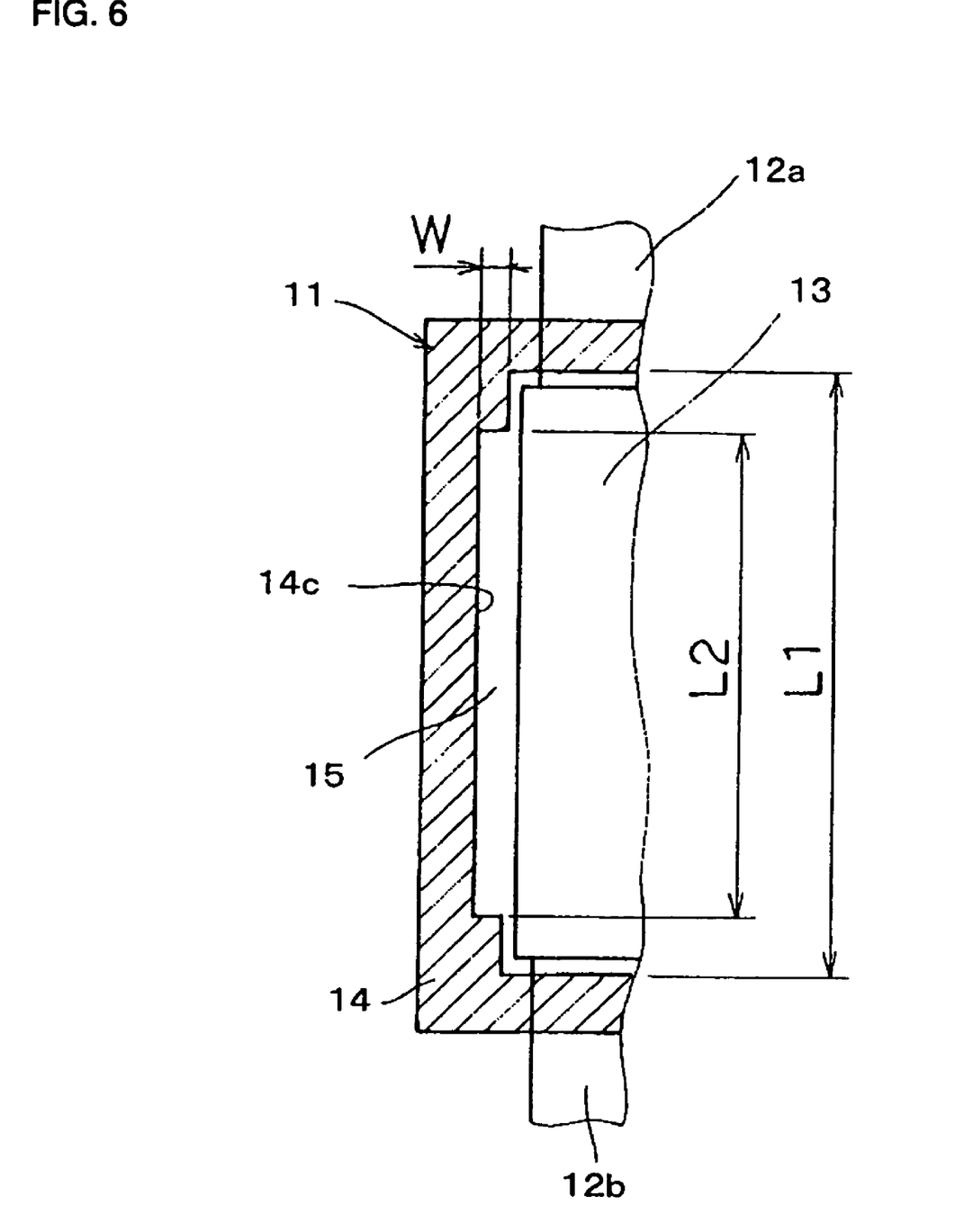
[FIG. 6]
A plan view of a main portion of the film covered battery, through the cell element, illustrating an example of the position and range in which the close contact zone is formed.

Thus, as illustrated in FIG. 6, the position at which close contact zone 15 is disposed is defined on the side of casing film 11 from which neither positive pole lead 12a nor negative pole lead 12b is drawn out, and moreover, on the side on which close contact zone 15 is disposed, length L2 of close contact zone 15, in the direction along that side, is defined to be one-half or more of distance L1 from one end to the other end of the inner edge of thermally sealed area 14. In this way, close contact zone 15 can cover substantially the entirety of the range in which casing film 11 is curved by the atmospheric pressure, thus making it possible to sufficiently relax a force which is applied to root 14c of thermally sealed area 14 to peel off casing films 11 when cell element 13 is sealed. As a result, the occurrence of micro-crack can be effectively suppressed in the thermally sealable resin layer of casing film 11, to prevent the degradation of the sealing reliability of cell element 13, which is triggered by this micro-crack. When L2 is less than one-half of L1, the peeling force, which acts on root 14c of thermally sealed area 14, is predominant on the side on which close contact zone 15 is disposed, so that this is not so effective from a viewpoint of suppressing the micro-crack from occurring in casing films 11.

From the foregoing, preferable as a position and a range for disposing close contact zone 15 is to dispose close contact zone 15, which has length L2 equal to or more than one-half of the aforementioned distance L1, at a position including the center of the range from one end to the other end of the inner edge of thermally sealed area 14 on the side, from which neither positive pole lead 12a nor negative pole lead 12b is drawn out. More preferable as the range of close contact zone 15 is that length L2 is equal to or more than ⅔ of the aforementioned distance L1, and further preferable is to dispose close contact zone 15 in the entire range from the one end to the other end of the inner edge of thermally sealed area 14 on the side from which neither positive pole lead 12a nor negative pole lead 12b is drawn out, i.e., L1=L2. Most preferably, close contact zone 15 is disposed over the full range of all the sides on which neither positive pole lead 12a nor negative pole lead 12b is disposed.

On the other hand, when paying attention to the position of thermally sealed area 14 in the thickness direction of cell element 13, in other words, in the direction in which the positive poles and negative poles are laminated, the effect by close contact zone 15 is particularly effective when thermally sealed area 14 is positioned between both surfaces of cell element 13 in the thickness direction of cell element 13. This is because when thermally sealed area 14 is positioned between both surfaces of cell element 13 in the thickness direction of cell element 13, a force acts to extend the angel θ (see FIG. 4) formed by casing films 11 to each other at root 14c of thermally sealed area 14.

As the case where thermally sealed area 14 is positioned between both surfaces of cell element 13 in the thickness direction of cell element 13, a representative example may be a case where casing films 11 have cup areas 11a on both sides in the thickness direction of cell element 13, as in this embodiment. However, thermally sealed area 14 can be positioned between both surfaces of cell element 13 even when the cup area is formed only on one side, or when no cup area is formed but casing films 11 deform in conformity to the outside shape of cell element 13 on both sides of cell element 13 in the thickness direction thereof, as a result, by the vacuum sealing. Even in such cases, the aforementioned problem can occur that angle θ formed by casing films 11 extends at root 14c of thermally sealed area 14. Therefore, the present invention is effective irrespective of the presence or absence of the cup area, as long as thermally sealed area 14 is positioned between both surfaces of cell element 13.

For relaxing the force acting on root 14c of thermally sealed area 14, close contact zone 15 may substantially have a region in which opposing casing films 11 are not thermally sealed to each other but are simply in close contact with each other. Therefore, width W of close contact zone 15 shown in FIG. 6 (the dimension of close contact zone 15 in a direction perpendicular to the lengthwise direction of the side on which close contact zone 15 is disposed) is sufficient if it is 0.5 mm or more. By reducing width W of close contact zone 15, it is possible to suppress an increase in the outside dimensions of the film covered battery due to close contact zone 15. Also, even when close contact zone 15 is formed to have width W exceeding 3 mm, there is not significant influence on the effect of relaxing the force acting on root 14c of thermally sealed area 14. On the contrary, close contact zone 15 having excessively large width W will increase the outer size of the battery. The outer size of the battery is preferably as small as possible. From the foregoing, width W of close contact zone 15 is preferably 0.5 mm or more and 3 mm or less.

Figure 7:
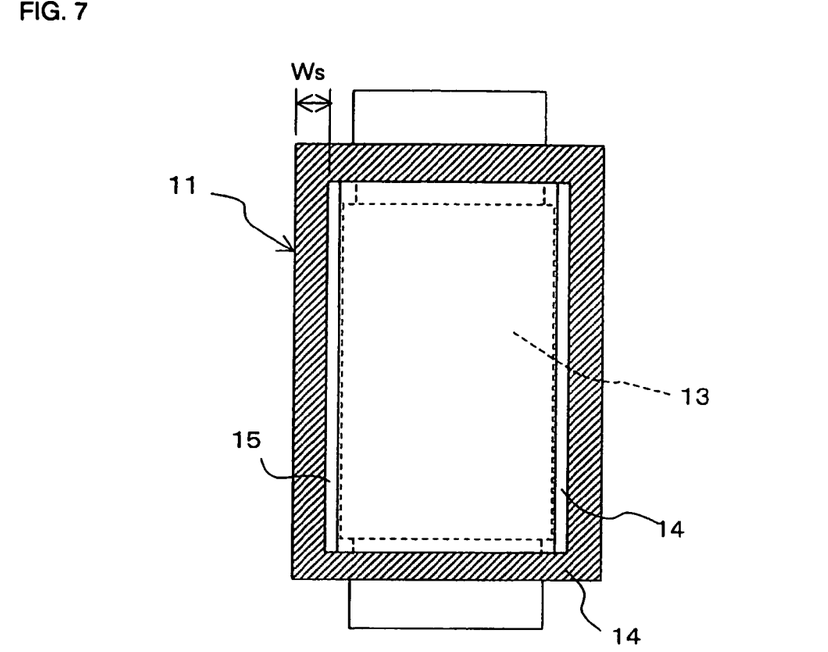
[FIG. 7]
A plan view of the film covered battery, illustrating another example of the close contact zone formed in the casing films.

Also, as illustrated in FIG. 7, when close contact zone 15 is disposed over the entire range from one end to the other end of the inner edge of thermally sealed area 14 on the side from which neither positive pole lead 12a nor negative pole lead 12b is drawn out, close contact zone 15 can be formed using a conventional general thermal sealing head by appropriately setting the position of the thermal sealing head with respect to cell element 13 when casing films 11 are thermally sealed. A preferred distance between cell element 13 and the thermal sealing head, for forming close contact zone 15, is determined as appropriate in accordance with the depth of cup areas formed in casing films 11, the size of the curvature of a shoulder of a dice used to form the cup areas through deep-draw molding, and the like. When cell element 13 having a thickness exceeding 6 mm is used, the root of thermally sealed area 14 is more likely to press against cell element 13. Taking such a case into consideration, the distance between cell element 13 and the thermal sealing head is preferably 2 mm or more, and more preferably 3 mm or more, and may be 4 mm or more.

Width Ws of thermally sealed area 14 is often slightly larger than the width of the thermal sealing head. This is because the melted thermally sealable resin of casing films 11 squeezes out by approximately 0.1 mm to 1 mm from a portion pressurized by the thermal sealing heads during the thermal sealing. If the thermally sealable resin squeezes in an excessively large amount, the position of the root of thermally sealed area 14 will correspondingly approach toward cell element 13. This is the reason for which the distance between cell element 13 and the thermal sealing heads is set to 2 mm or more.

Figure 8:
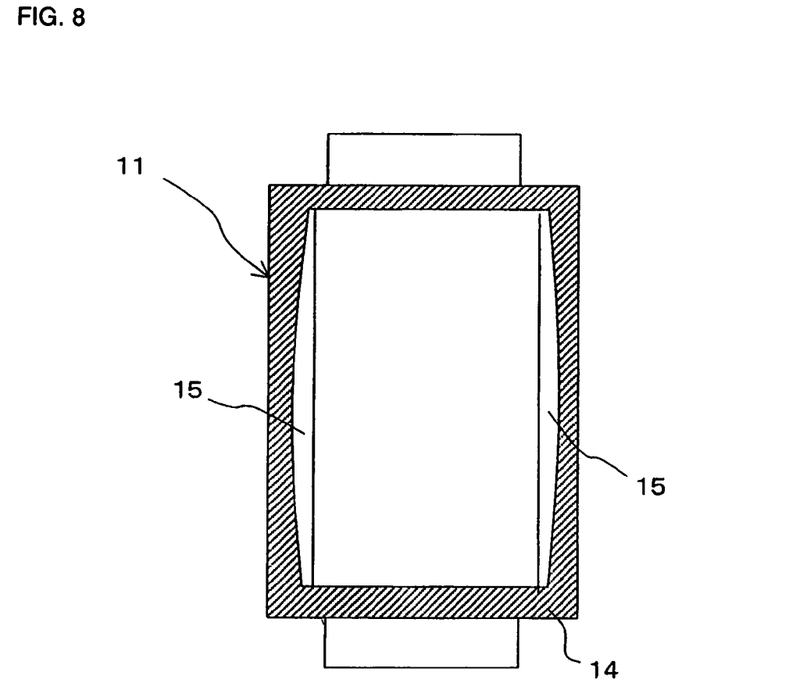

While the foregoing embodiment has shown an example in which the close contact zone is formed with a uniform width, the width of the close contact zone may not be uniform. One such example is illustrated in FIG. 8. In the example illustrated in FIG. 8, close contact zone 15 is formed such that it has the largest width at the center of a range from one end to the other end of the thermally sealed area on a side on which it is disposed, and the width is narrower toward both ends of the side. As described above, when the film covered battery, in which the cell element is sealed under a reduced pressure, is returned into the atmospheric pressure, the amount of deformation of casing film 11 is the largest at the center in the lengthwise direction of the side from which no lead is drawn out, and is gradually smaller toward both ends from the center. Thus, close contact zone 15 can be effectively utilized by changing the width of close contact zone 15 in accordance with the amount of deformation of casing films 11 depending on the location.

While close contact zone 15 is formed over the entirety of the side on which no lead is disposed in FIG. 8, the length of close contact zone 15 may be one-half or more of the distance from one end to the other end of the inner edge of the thermally sealed area. Also, the width of close contact zone 15 may continuously vary or may discontinuously vary.

While the present invention has been described giving several representative examples, it is apparent that the present invention is not limited to those, but can be modified as appropriate within the scope of the technical idea of the present invention.

For example, in regard to the structure of the cell element, the foregoing example has shown a laminate type which has a plurality of alternately laminated positive poles and negative poles, but the cell element may be of a winding type which has a positive pole and a negative pole disposed alternatively by forming the positive pole, negative pole, and separator in strip shape, placing the positive pole and negative pole, to each other, with the separator sandwiched therebetween, winding this, and compressing this into a flat shape.

Also, as the cell element, an arbitrary cell element used in general batteries can be applied as long as it includes a positive pole, a negative pole, and an electrolyte. A cell element in a general lithium secondary battery is formed by placing a positive pole plate which is an aluminum foil or the like coated with a positive pole active material, such as a lithium/manganese composite oxide and lithium cobalate, on both surfaces, and a negative pole plate which is a copper foil or the like coated with a carbon material, which can dope/dedope lithium, on both sides, opposite to each other through a separator, and impregnating it with an electrolytic solution containing a lithium salt. Other cell elements may be cell elements for other types of chemical batteries such as a nickel hydrogen battery, a nickel cadmium battery, a lithium metal primary battery or secondary battery, a lithium polymer battery, and the like. Further, the present invention can be applied to an electric device, such as a capacitor element exemplified by a capacitor such as an electric double-layer capacitor, an electrolytic capacitor, and the like, which stores electric energy therein by the action of a positive pole and a negative pole which oppose each other.

Further, while FIG. 1 illustrates an example in which positive pole lead 3 and negative pole lead 4 are extended from opposing sides of film covered battery 1, they may be extended from the same side.

EXAMPLES

In the following, specific examples of the present invention will be described together with a comparative example.

Example 1

A plurality of positive poles and a plurality of negative poles, made by coating an electrode material on both surfaces of metal foils, were alternately stacked through separators. An aluminum foil was used for the metal foil for the positive poles. A copper foil was used for the metal foil for the negative poles. A micro-porous film made of polyethylene of 30 µm thick was used as the separators. The separators, which are rectangular, was made to have a size of 75 mm wide and 130 mm deep, which was larger than the size of the positive pole by 2 mm both in length and width, and was substantially the same size as the positive pole. The outermost pole was chosen to be the negative pole, and the separator was disposed outside this negative pole as well. Specifically, the order is separator/negative pole/separator/positive pole/separator/ . . . /negative pole/separator. The thickness of the laminate made up of the positive poles, negative poles, and separators was chosen to be 10 mm. Also, in laminating the positive poles and negative poles, the orientation was arranged such that portions not coated with the electrode material of the positive poles and negative poles were oriented to opposite sides in order to orient the positive pole lead and negative pole lead in the opposite directions.

Next, an aluminum plate having a predetermined thickness, a predetermined width, and a length of 50 mm (a direction in which a current flows is defined to be the "lengthwise-direction"), which would serve as the positive pole lead, and the portions of the positive poles not coated with the electrode material were ultra-sonic welded in block. Similarly, a copper plate of 0.1 mm thick, 40 mm wide, and 50 mm long, which would serve as the negative lead, and the portions of the negative poles not coated with the electrode material were ultra-sonic welded in block. In the foregoing manner, a laminate which would constitute a cell element was fabricated.

On the other hand, a laminate film which had nylon (25 µm thick), soft aluminum (40 µm thick), acid metamorphic polypropylene (15 µm thick), and polypropylene (30 µm thick) laminated in this order, was prepared as a casing film. The prepared laminate film was cut in a predetermined size, and deep-draw molded using a dice, a punch, and a deep-draw molder having a blank holding pad. The dice was formed with a rectangular opening, and the dimension of the opening in a direction corresponding to the horizontal direction of the cell element was set to 76 mm. Also, the radius of the shoulder (see reference numeral 21a in FIG. 2) of the dice was set to 1 mm. In other words, the horizontal dimension of the cup area formed by the deep-draw molding is 78 mm including the base of the R-section. The drawing depth was set to 5 mm.

Next, a portion of the laminate film molded into a cup shape, which is in the shape of flange around the cup area, was trimmed to have a side of 10 mm wide. Another one was fabricated in a similar manner by molding the laminate film to form a cup area therein, and trimming the periphery.

Then, the two laminate films, having the cup area, were opposed such that the cell element was sandwiched therebetween, to receive the cell element in the cup areas. In this state, the positive pole lead and negative pole lead were drawn out from two opposing shorter sides of the laminate films.

Next, the laminate films were formed into a bag shape by thermally sealing the sides of the laminate films, from which the positive/negative pole leads were drawn out, and also thermally sealing one of the remaining two longer sides. After pouring an electrolytic solution into the bag-shaped laminate films from the unsealed side thereof, the remaining one side was thermally heated under a reduced pressure using a vacuum sealing machine having a thermal sealing machine within a vacuum chamber to seal the cell element. When the two longer sides of the laminate films were thermally sealed, the thermal sealing was performed with a thermal sealing head spaced apart by 4 mm from the cell element. In other words, the distance from the end of the separator of the cell element to the contact end of the thermal sealing head was chosen to be 4 mm.

After sealing the cell element under a reduced pressure, the vacuum chamber was returned to the atmospheric pressure. The resulting film covered battery was extracted from the vacuum chamber to observe its appearance. Between a thermally sealed area of the two longer sides and the cell element, a close contact zone, in which the laminate films were not adhered to each other but were in close contact with each other by the atmospheric pressure, was formed over an entire inner edge of the thermally sealed area, as illustrated in FIG. 5B. The close contact zone had a width of 3 to 3.5 mm. Also, the two longer sides were inwardly curved, as illustrated in FIG. 9, where a central portion, having the largest amount of curving, indented by approximately 0.5 mm inwardly from both ends, and a close contact zone was also formed in width of approximately 3 mm in the central portion. Length L2 (see FIG. 6) of the close contact zone, and distance L1 (see FIG. 6) from one end to the other end of the inner edge of the thermally sealed area were both 146 mm.

When the film covered battery was disassembled to observe the thermally sealed area of the longer sides, a flash of the resin of the laminate film was found approximately 0.5 mm at the root of the thermally sealed area in a direction indenting into the cell from a pressure applying end of the thermal sealing head. Then, this protruding resin was observed with a microscope from the inside of the battery, no whitened resin was found. Further, no crack was found even in an observation using a high-magnification reflection-type optical microscope.

Example 2

A film covered battery was fabricated in a similar manner to Example 1 except that a cell element was spaced apart by 3 mm from the thermal sealing head when two longer sides were thermally sealed.

In this example, a close contact zone was also formed between a thermally sealed area of the two longer sides and the cell element in the fabricated film covered battery, as is the case with Example 1. The width of the close contact zone ranged from 1.5 to 2.5 mm. Also, the two longer sides curved in a similar manner to Example 1, where a central portion, having the largest amount of curving, indented by approximately 1 mm inwardly from both ends, and a close contact zone was also formed in width of approximately 1.5 mm in the central portion.

When the film covered battery was disassembled to observe the thermally sealed area of the longer sides, a flash of resin was found approximately 0.5 mm at the root of the thermally sealed area in this example, as is the case with Example 1. The protruding portion of the resin was observed with a microscope from the inside of the battery in a similar manner to Example, 1, but neither whitened resin nor crack was observed.

Comparative Example

A film covered battery was fabricated in a similar manner to Example 1 except that a cell element was spaced apart by 3 mm from the thermal sealing head when two longer sides were thermally sealed.

In this example, the fabricated film covered battery also had two longer sides inwardly curving as illustrated in FIG. 9, where a central portion, having the largest amount of curving, indented by approximately 1 mm inwardly from both ends. In the central portion of the longer side, the root of the thermally sealed area was pressed against the cell element, which was also able to be observed from the appearance. No close contact zone was formed there.

When the film covered battery was disassembled to observe the thermally sealed area of the longer sides, a flash of resin was also found approximately 0.5 mm at the root of the thermally sealed area in this example, as is the case with Example 1. When the protruding portion of the resin was observed with a microscope from the inside of the battery, whitening was observed over a length of approximately 98 mm centered at the center of the longer side. When the whitened portion was further observed with a high-magnification reflection type optical microscope, the existence of crack was recognized.

The invention claimed is:

1. A film covered electric device comprising:
an electric device element to which a positive pole lead and a negative pole lead are connected; and
a casing film comprising a thermally sealable resin layer wrapped around said electric device element such that the leads extend from at least one side of the film, the casing film having a thermally sealed area in which opposing surfaces of the film are thermally sealed around said electric device element,
wherein said casing film has a cup area for receiving said electric device element therein, whereby a thermally sealed area is positioned outside of the cup area, and disposed within a range of the thickness of the electric device element,
at least one of the sides of said thermally sealed casing film, from which said leads are not extended, is formed with a contact zone between the thermally sealed area and the electric device element, in which opposing surfaces of the casing film are directly opposing without intervention of said electric device element and are in contact with each other without being thermally sealed,
a length L2 of the contact zone in a direction parallel to a side of the electric device element is at least half of a length L1 from one end to the other end of an inner edge of said thermally sealed area on the side formed with the contact zone, in a direction parallel to L2, and
an angle formed by the surfaces of the casing film opposing each other in the contact zone is held at substantially zero degrees at a root of the thermally sealed area.

2. The film covered electric device according to claim 1, wherein said contact zone is formed at a position including a center of a range from one end to the other end of an inner edge of said thermally sealed area on the side formed with said contact zone in the direction parallel to a side of the electric device element.

3. The film covered electric device according to claim 2, wherein said contact zone is formed over the entire range from one end to the other end of the inner edge of said thermally sealed area on the side formed with said contact zone in the direction parallel to a side of the electric device element.

4. The film covered electric device according to claim 2, wherein said contact zone has a width which continuously or discontinuously varies such that the width is largest at the center in the range from one end to the other end of the inner edge of said thermally sealed area on the side formed with said contact zone.

5. The film covered electric device according to claim 1, wherein said contact zone is formed along all sides of said easing film from which said leads are not extended.

6. The film covered electric device according to claim 1, wherein said cup area is formed on both surfaces of the film perpendicular to the thickness direction of said electric device element.

7. The film covered electric device according to claim 1, wherein said contact zone has a width of 0.5 mm or more.

8. The film covered electric device according to claim 1, wherein said electric device element has a thickness of 6 mm or more.

9. The film covered electric device according to claim 1, wherein said electric device element is a chemical cell element or a capacitor element.

10. A method of manufacturing a film covered electric device, comprising the steps of:
wrapping a casing film comprising a thermally sealable resin layer around an electric device element to which a positive pole lead and a negative pole lead are connected such that the leads extend from at least one side of the film;
pressing and heating opposing surfaces of the casing film at peripheral sides of said casing film with a thermal sealing head to thermally seal said electric device element within said casing film, wherein at least the last one side of the peripheral sides is thermally sealed in a reduced pressure atmosphere; and returning surroundings of said casing film which seals said electric device element into an atmospheric pressure, wherein at least one of the sides of the film having a thermally sealed area from which said leads are not extended is sealed by applying pressure to said casing film with the thermal sealing head at a position spaced apart by 2 mm or more from said electric device element, wherein at least one of the sides of said casing film having a thermally sealed area, from which said leads are not extended, is formed with a contact zone between the thermally sealed area and the electric device element, in which opposing surfaces of the casing film are directly opposing without intervention of said electric device element are in contact with each other without being thermally sealed, and an angle formed by the surfaces of the casing film opposing each other in the contact zone is held at substantially zero degrees at a root of the thermally sealed area.

11. The film covered electric device according to claim 1, wherein the casing film further comprises a metal layer laminated to the thermally sealable resin layer, such that the resin layer is the innermost layer of the film prior to being thermally sealed.

12. The film covered electric device according to claim 1, wherein the contact zone is formed between the thermally sealed area and the cup area.

13. The film covered electric device according to claim 1, wherein the opposing surfaces of the casing film in the contact zone are substantially parallel at an edge of the cup area.

14. The film covered electric device according to claim 1, wherein the casing film comprises two opposing laminate films sandwiching the electric device element between them.

* * * * *